United States Patent [19]
Eisen et al.

[11] Patent Number: 6,021,488
[45] Date of Patent: Feb. 1, 2000

[54] DATA PROCESSING SYSTEM HAVING AN APPARATUS FOR TRACKING A STATUS OF AN OUT-OF-ORDER OPERATION AND METHOD THEREOF

[75] Inventors: Susan Elizabeth Eisen, Austin; James Edward Phillips, Round Rock, both of Tex.

[73] Assignee: International Business Machines Corp., Armonk, N.Y.

[21] Appl. No.: 08/935,939

[22] Filed: Sep. 23, 1997

[51] Int. Cl.[7] .................................................. G06F 15/00

[52] U.S. Cl. ........................... 712/228; 712/23; 712/222

[58] Field of Search ............................... 395/800.2, 394, 395/393, 563, 569, 392, 381; 712/23, 222, 228, 216, 217, 218, 205

[56] References Cited

U.S. PATENT DOCUMENTS

| | | | |
|---|---|---|---|
| 5,500,943 | 3/1996 | Ho et al. ................................. | 395/381 |
| 5,634,103 | 5/1997 | Dietz et al. ............................ | 395/582 |
| 5,751,946 | 5/1998 | Afsar et al. ........................ | 395/183.03 |
| 5,812,811 | 9/1998 | Dubey et al. ........................... | 395/392 |
| 5,826,070 | 10/1998 | Olson et al. ........................... | 395/563 |
| 5,828,895 | 12/1998 | Chan et al. .............................. | 712/23 |

OTHER PUBLICATIONS

Edited by Cathy May, Ed Silha, Rick Simpson, Hank Warren, International Business Machines, Inc., The PowerPC Architecture: A Specification for a New Family of RISC Processors, Morgan Kaufmann Publishers, Inc., pp. 137–141,and 193–196.

*Primary Examiner*—Larry D. Donaghue
*Attorney, Agent, or Firm*—Barry S. Newberger; Winstead Sechrest & Minick P.C.; Anthony V. S. England

[57] ABSTRACT

An FPSCR (Floating Point Status and Control Register) mechanism supports out-of-order floating point unit instruction execution. The FPSCR mechanism provides appropriate reporting of exceptions to a re-order buffer implemented within a data processing system to allow precise interrupts during out-of-order instruction execution. Additionally, the FPSCR mechanism allows for the retention of the appropriate status and control history information in an FPSCR rename buffer to allow the floating points status and control register to be maintained as though instructions were being executed in order. Additionally, the FPSCR mechanism generates the FPSCR's sticky exception status in concordance with reporting appropriate status to the previously mentioned re-order buffer and saving history into the FPSCR rename buffer. Furthermore, the FPSCR mechanism generates non-sticky status bits in addition to an FPU pipe state for retention in the FPSCR rename buffer in addition to an instruction issue mechanism that supports the generation of FPU pipe state bits to support calculation of non-sticky status bits stored within the FPSCR. By implementing each of these functions, the FPSCR mechanism permits the out-of-order execution of eligible floating point unit instructions.

22 Claims, 6 Drawing Sheets

DATA PROCESSING SYSTEM HAVING AN APPARATUS FOR TRACKING A STATUS OF AN OUT-OF-ORDER OPERATION AND METHOD THEREOF

TECHNICAL FIELD

The present invention relates in general to a data processing system, and in particular, to a data processing system performing out-of-order execution.

BACKGROUND INFORMATION

As computers have been developed to perform a greater number of instructions at greater speeds, many types of architectures have been developed to optimize this process. For example, a reduced instruction set computer (RISC) device utilizes fewer instructions and greater parallelism in executing those instructions to ensure that computational results will be available more quickly than the results provided by more traditional data processing systems. In addition to providing increasingly parallel execution of instructions, some data processing systems implement out-of-order instruction execution to increase processor performance. Out-of-order instruction execution increases processor performance by dynamically allowing instructions dispatched with no data dependencies to execute before previous instructions in an instruction stream that have unresolved data dependencies. In some data processing systems, instructions are renamed and instruction sequencing tables, also referred to as re-order buffers, facilitate out-of-order execution by re-ordering instruction execution at instruction completion time.

Re-order buffer devices are also used to allow speculative instruction execution. Therefore, data processing systems which support speculative instruction execution can be adapted for out-of-order execution with the addition of relatively minimal hardware. A portion of this added hardware includes issue logic which is used to determine a time and order that instructions should be issued. Such issue logic can be extremely complex since the dependencies of instructions and a state of a pipeline in which the instructions are being executed must be examined to determine a time at which the instruction should issue. If the issue logic is not properly designed, such issue logic can become a critical path for the data processing system and limit the frequency of instruction execution such that performance gains which could be achieved by out-of-order issue are destroyed.

The out-of-order instruction execution implemented by many prior art systems increases processor performance by dynamically allowing instructions dispatched with no data dependencies to execute before previous instructions in the instruction stream that have unresolved data dependencies. Register file renaming, renaming selected bits of architected facilities such as floating point status and control registers (FPSCR), and instruction sequencing tables (re-order buffers) facilitate out-of-order execution by re-ordering instruction execution at instruction completion time. For more information on such structures, refer to "An Efficient Algorithm for Exploiting Multiple Arithmetic Units," by R. M. Tomasulo, published in *IBM Journal*, January 1967, pp. 25–33. It should be noted that these devices are also used to allow speculative instruction execution. Therefore system architecture supporting speculative instruction execution can be adapted for out-of-order execution with the addition of relatively "little" hardware and few overhead expenses. Thus, register file renaming may support out-of-order execution without modification from a speculative instruction execution architecture. However, renaming of the floating point status and control register (FPSCR) is typically insufficient to support out-of-order instruction execution operations, even though it is utilized to perform some functions in speculative instruction execution. In prior art renaming methodologies, values were saved in rename buffers that were exact and complete for execution of an instruction. Therefore, when a data processing system was "told" to complete, the appropriate value was selected and stored in an architected destination in an unmodified state. For in-order, but speculative execution, this methodology was also executed for an FPSCR. A value stored in the FPSCR could be calculated exactly for an executing instruction. Subsequently, at completion, the value was read and a latest completing value was selected and put in the FPSCR. However, when instructions are executed out-of-order, an exact value to be stored in the FPSCR can not be guaranteed to be calculated exactly, because the FPSCR contains history of prior executing instructions. Thus, when an instruction executes out-of-order, results from earlier instructions in an instruction stream are unavailable as partial results are sometimes saved in the rename buffer. At completion time, the exact value must be constructed from all values completing and all prior completing values to produce a correct result.

Therefore, a need exists for a data processing system and method for implementing an FPSCR that may be obtained in a correct form at completion.

SUMMARY OF THE INVENTION

The previously mentioned needs are fulfilled with the present invention. Accordingly, there is provided, in a first form, a data processing system. The data processing system includes an input circuit for communicating a plurality of instructions and a register for storing a status control value. The data processing system also includes a first status logic circuit for selectively generating a first plurality of status values in response to the first one of the plurality of instructions. A re-order logic circuit is connected to the first status logic circuit to receive the first plurality of status values. The re-order logic circuit is connected to the register to receive the status control value. The re-order logic circuit generates a current status control value in response to the first plurality of status values and the status control value.

Additionally, there is provided, in a second form, a method operating a data processing system. The method includes the steps of communicating a plurality of instructions and storing a status control value in a register. The method also includes the steps of selectively generating a first plurality of status values in response to the first one of the plurality of instructions and generating a current status control value in response to the first plurality of status values and the status control value.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
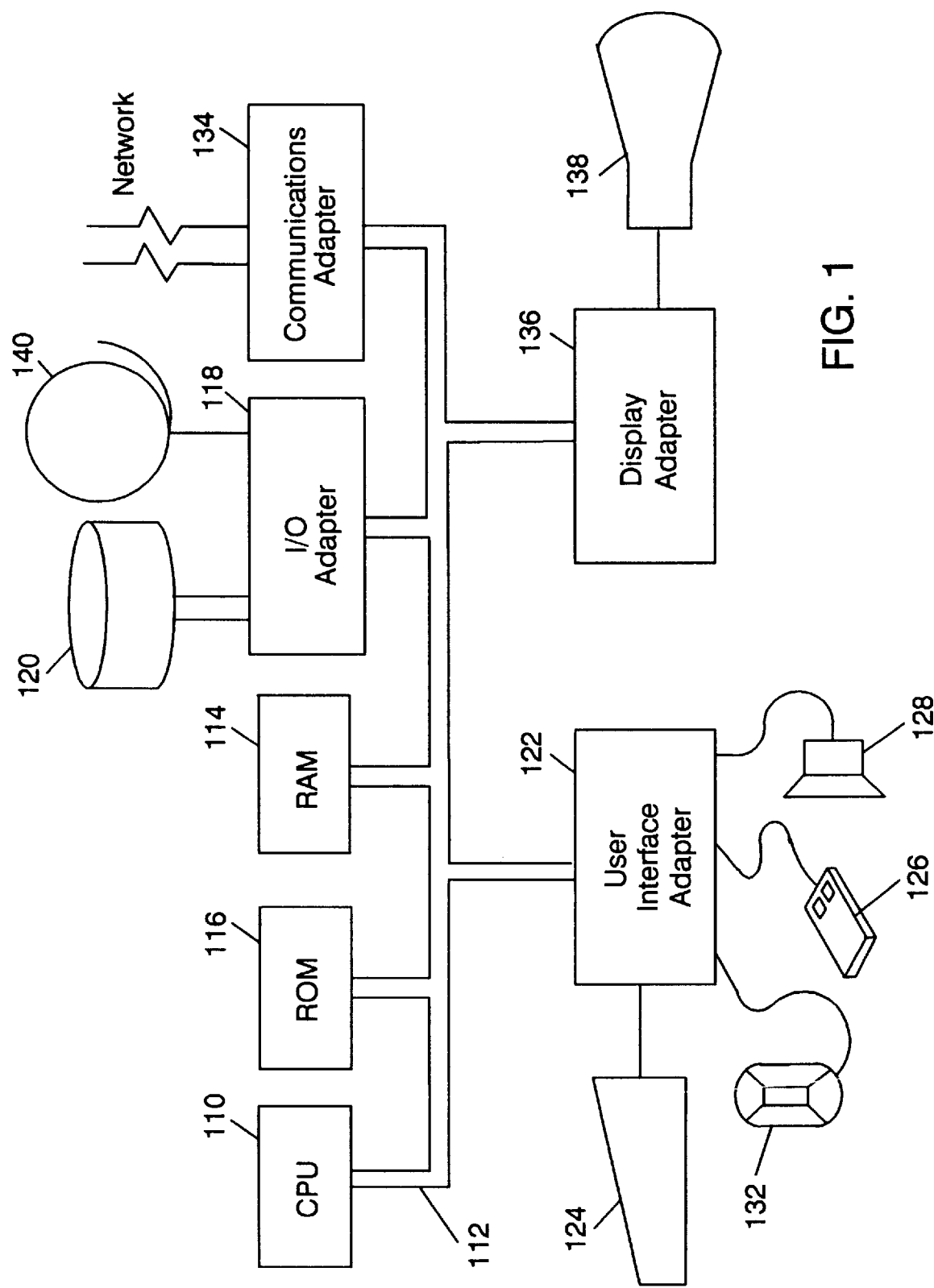
FIG. 1 illustrates, in block diagram form, a data processing system in accordance with one embodiment of the present invention.

The present invention provides an FPSCR (floating point status and control register) mechanism that supports out-of-order floating point unit instruction execution. The FPSCR mechanism of the present invention provides appropriate reporting of exceptions to the re-order buffer implemented within the data processing system to allow precise interrupts during out-of-order instruction execution. Additionally, the FPSCR mechanism of the present invention allows for the retention of the appropriate status and control history information in an FPSCR rename buffer to allow the floating point status and control register (FPSCR) to be maintained as though instructions were being executed in order. Additionally, the present invention generates the FPSCR's sticky exception status in concordance with reporting appropriate status to the previously mentioned re-order buffer and saving history into the FPSCR rename buffer. It should be noted that an FPSCR sticky exception refers to an exception based upon a sticky status bit. A sticky status bit is a bit which stays set until an instruction implemented by the external user determines that the bit is no longer required to be set. Additionally, the FPSCR mechanism of the present invention generates non-sticky status bits in addition to an FPU pipe state for retention in the FPSCR rename buffer. Furthermore, the mechanism of the present invention implements an instruction issue mechanism that supports the generation of FPU pipe state bits to support calculation of non-sticky status bits stored within the FPSCR. The FPSCR mechanism of the present invention also generates an architected FPSCR from the rename buffer by re-ordering the FPSCR sticky bits upon instruction completion, generates exception summary bits from the sticky status re-ordering operation, and calculates the non-sticky status bits by using the non-sticky exception status bits and the FPU pipe state retained in the FPSCR rename buffer. By implementing each of the steps and functions provided above, the FPSCR mechanism of the present invention permits the out-of-order execution of eligible FPU instructions. Additionally, the present invention implements a scheme which does not allow for out-of-order execution of certain instructions which will subsequently be described in greater detail. For the instructions which are not permitted to be executed out-of-order, the execution is assumed to be serialized or execution synched to facilitate their execution.

Operation of the present invention will subsequently be described in greater detail. Prior to that discussion, however, a description of connectivity of the elements of the present invention will be provided.

Description of Connectivity

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Furthermore, during a description of the implementation of the invention, the terms "assert" and "negate" and various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state. Additionally, a binary value may be indicated by a "%" symbol proceeding a value and a hexadecimal value may be indicated by a "$" symbol preceding a value.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The out-of-order FPSCR mechanism of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
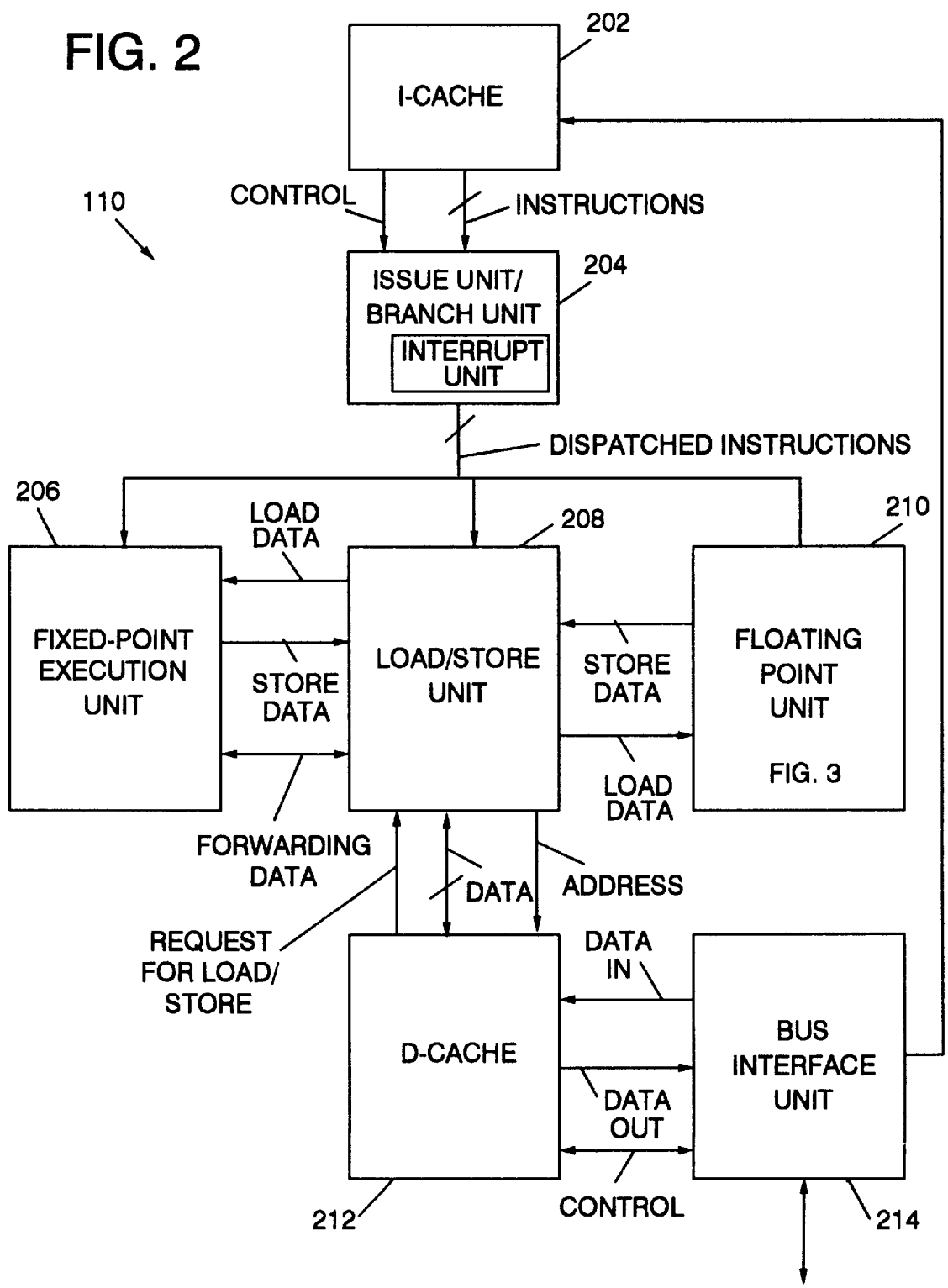
FIG. 2 illustrates, in block diagram form, a central processing unit in accordance with one embodiment of the present invention.

FIG. 2 illustrates a portion of CPU 110 in greater detail. The portion of CPU 110 comprises an instruction cache (I-cache) 202, an instruction unit/branch unit 204, a fixed point execution unit (fxu) 206, a load/store unit 208, a floating point unit (fpu) 210, a data cache (D-cache) 212, and a bus interface unit (BIU) 214.

I-cache 202 is coupled to instruction unit/branch unit 204 to communicate control information and a plurality of instructions. Instruction unit/branch unit 204 is coupled to each of FXU 206, load/store unit 208, and FPU 210 to provide a plurality of dispatched instructions. I-cache 202 is coupled to bus interface unit 214 to communicate Data and Control information. FXU 206 is coupled to load/store unit 208 to communicate a load data value, a store data value, and a forwarding data value. Load/store unit 208 is coupled to FPU 210 to communicate a store data value and load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal.

Figure 3:
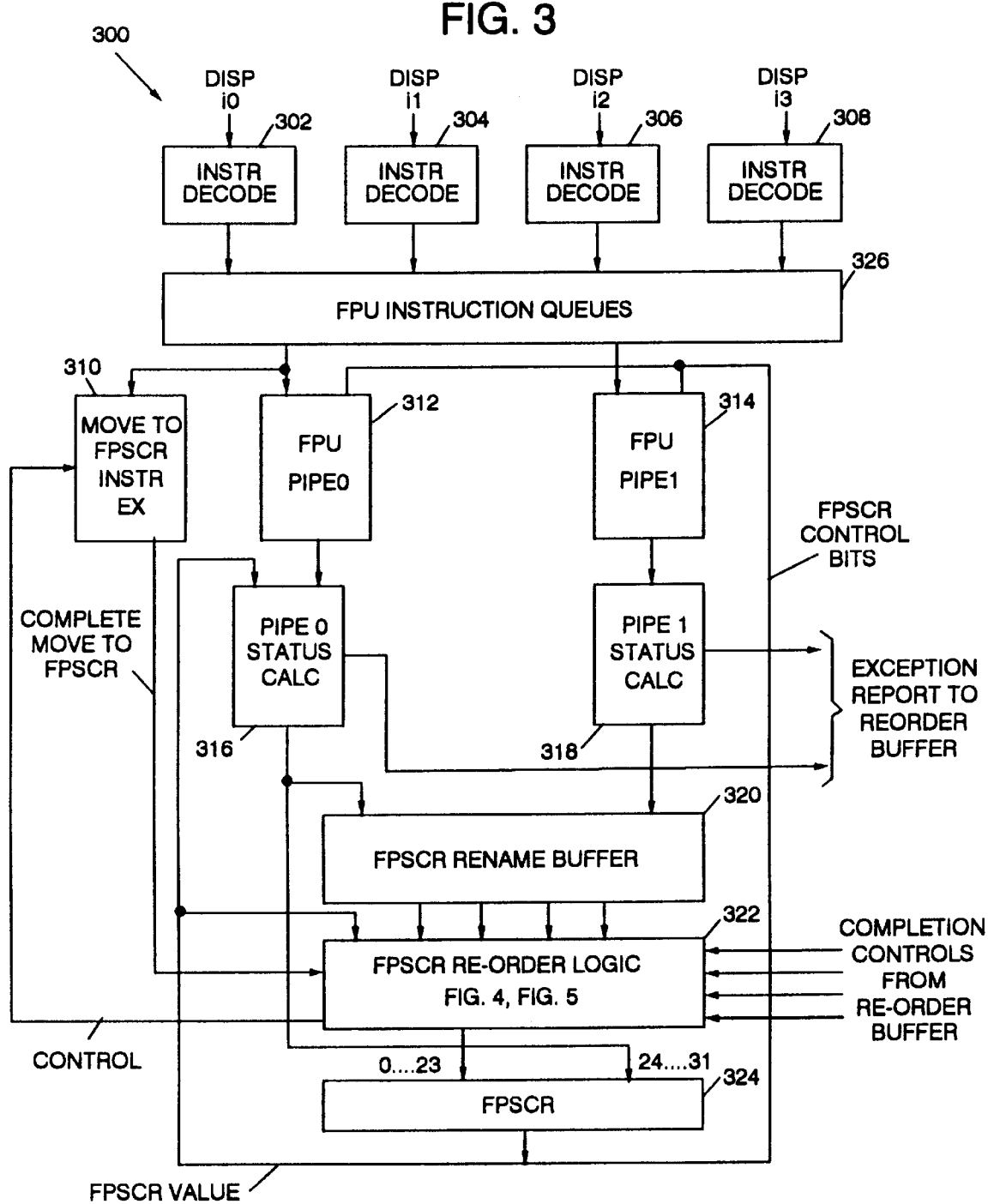
FIG. 3 illustrates, in block diagram form, an out-of-order FPSCR mechanism implemented in accordance with one embodiment of the present invention.

FIG. 3 illustrates an FPSCR mechanism within floating point unit 210 of FIG. 2. FPSCR mechanism 300 comprises an instruction decode circuit 302, an instruction decode circuit 304, an instruction decode instruction 306, an instruction decode instruction 308, a move to FPSCR circuit 310, an FPU pipe 0 312, an FPU pipe 1 314, a pipe 0 status circuit 316, a pipe 1 status circuit 318, an FPSCR rename buffer 320, an FPSCR re-order logic circuit 322, an FPSCR (floating point status and control register) 324, and a plurality of FPU instruction queues 326.

During operation, a dispatched instruction i0, labeled "disp i0", is provided to instruction decode circuit 302. An output of instruction decode circuit 302 is coupled to the plurality of FPU instruction queues 326. A second dispatched instruction, labeled "disp i1", is provided to instruction decode circuit 304. An output of instruction decode circuit 304 is coupled to the plurality of FPU instruction queues 326. A third dispatched instruction, labeled "disp i2", is provided to an input of instruction decode circuit 306. An output of instruction decode circuit 306 is coupled to the plurality of FPU instruction queues 326. A fourth dispatched instruction, labeled "disp i3", is provided to an input of instruction decode circuit 308. An output of instruction decode circuit 308 is coupled to the plurality of FPU instruction queues 326. An output of the plurality of FPU instruction queues 326 is coupled to move to FPSCR circuit 310 and FPU pipe 0 310. Additionally, an output of the plurality of FPU instruction queues 326 is coupled to FPU pipe 1 314. An output of move to FPSCR circuit 310 is coupled to FPSCR re-order logic 322. An output of FPSCR re-order logic 322 is coupled to move to FPSCR circuit 310. An output of FPU pipe 0 312 is coupled to pipe 0 status circuit 316. An output of FPU pipe 1 314 is coupled to pipe 1 status circuit 318. An output of pipe 1 status circuit 318 provides a first exception report signal to a re-order buffer (not illustrated in detail herein) within issue unit/branch unit 204. An output of pipe 1 status circuit 318 is also coupled to FPSCR rename buffer 320. An output of pipe 0 status circuit 316 provides a second exception report signal to a re-order buffer (not illustrated in detail herein). Additionally, pipe 0 status circuit 316 is coupled to FPSCR rename buffer 320 and FPSCR 324. FPSCR rename buffer 320 is coupled to FPSCR re-order logic circuit 322 to provide a plurality of outputs. FPSCR re-order logic 322 receives a plurality of completion control signals from a re-order buffer (not illustrated in detail herein). FPSCR re-order logic circuit 322 is coupled to FPSCR 324 to provide a first plurality of bits thereto. Additionally, it should be noted that an input to FPSCR 324 from pipe 0 status circuit 316 provides bits 24 through 31 at a value stored therein. It should be noted that fewer bits or more bits may also be stored within FPSCR 324. An output of FPSCR 324 is coupled to pipe 0 status circuit 316, FPSCR re-order logic circuit 322, FPU pipe 1 314, and FPU pipe 0 312.

Figure 4:
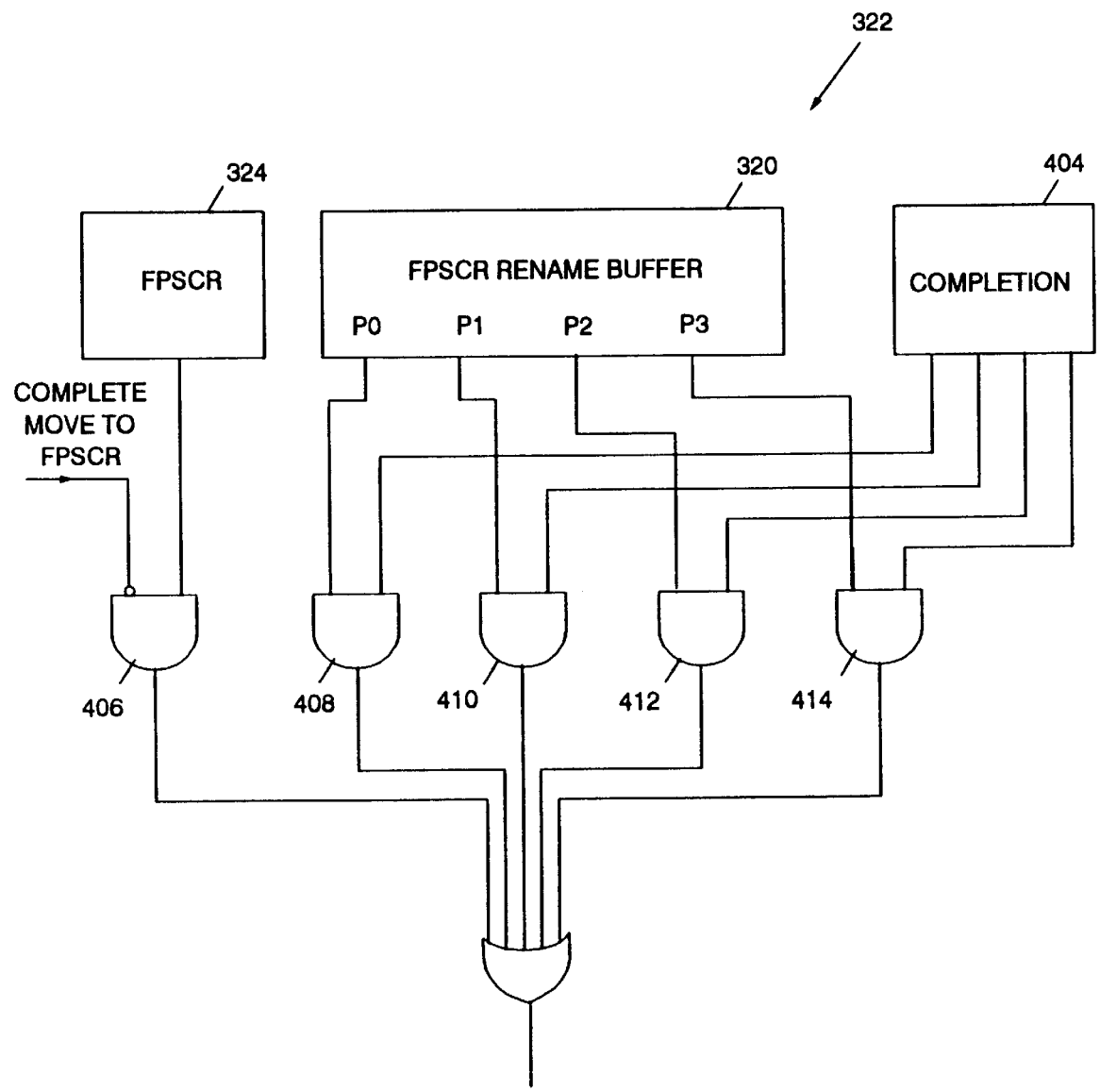
FIG. 4 illustrates, in partial block diagram form, an FPSCR re-order logic circuit in accordance with one embodiment of the present invention.

FIG. 4 illustrates an embodiment of FPSCR re-order logic circuit 322 for "sticky" bits. Re-order logic circuit 322 comprises an AND gate 406, an AND gate 408, an AND gate 410, an AND gate 412, an AND gate 414, and an OR gate 416. A complete move to FPSCR signal is inverted and provided to a first input of AND gate 406 provided that a move-to-FPSCR instruction has executed in FPU pipe 0 312. A pre-selected stick bit from the architected FPSCR 324 is provided to a second input of AND gate 406. A corresponding pre-selected bit from FPSCR rename buffer 320 is provided by Port 0 (P0) of FPSCR rename buffer 320 to a first input of AND gate 408. A corresponding first completion signal is provided from completion circuitry 404 of FPSCR re-order logic circuit 322 to a second input of AND gate 408. The first completion signal is provided to a second input of AND gate 408. A second corresponding pre-selected bit associated with a second completing instruction is indicated via a second completion signal 402 provided from port 1 (P1) of FPSCR rename buffer 320 to a first input of AND gate 410. A second completion signal is provided from completion circuit 404 to a second input of AND gate 410. A third corresponding pre-selected bit associated with a third completing instruction is provided to a first input of AND gate 412 via a port 2 (P2) of FPSCR rename buffer 320. A third completion signal is provided via completion circuit 404 to a second input of AND gate 412. A fourth corresponding pre-selected bit associated with a fourth completing instruction is provided to a first input of AND gate 414 via a fourth port (P3) of FPSCR rename buffer 320. A fourth completion signal is provided from completion circuit 404 to a second input of AND gate 414. An output of each of AND gate 406, AND gate 408, AND gate 410, AND gate 412, and AND gate 414 is provided to a respective input of OR gate 416. An output of OR gate 416 is provided to FPSCR 324.

Figure 5A:
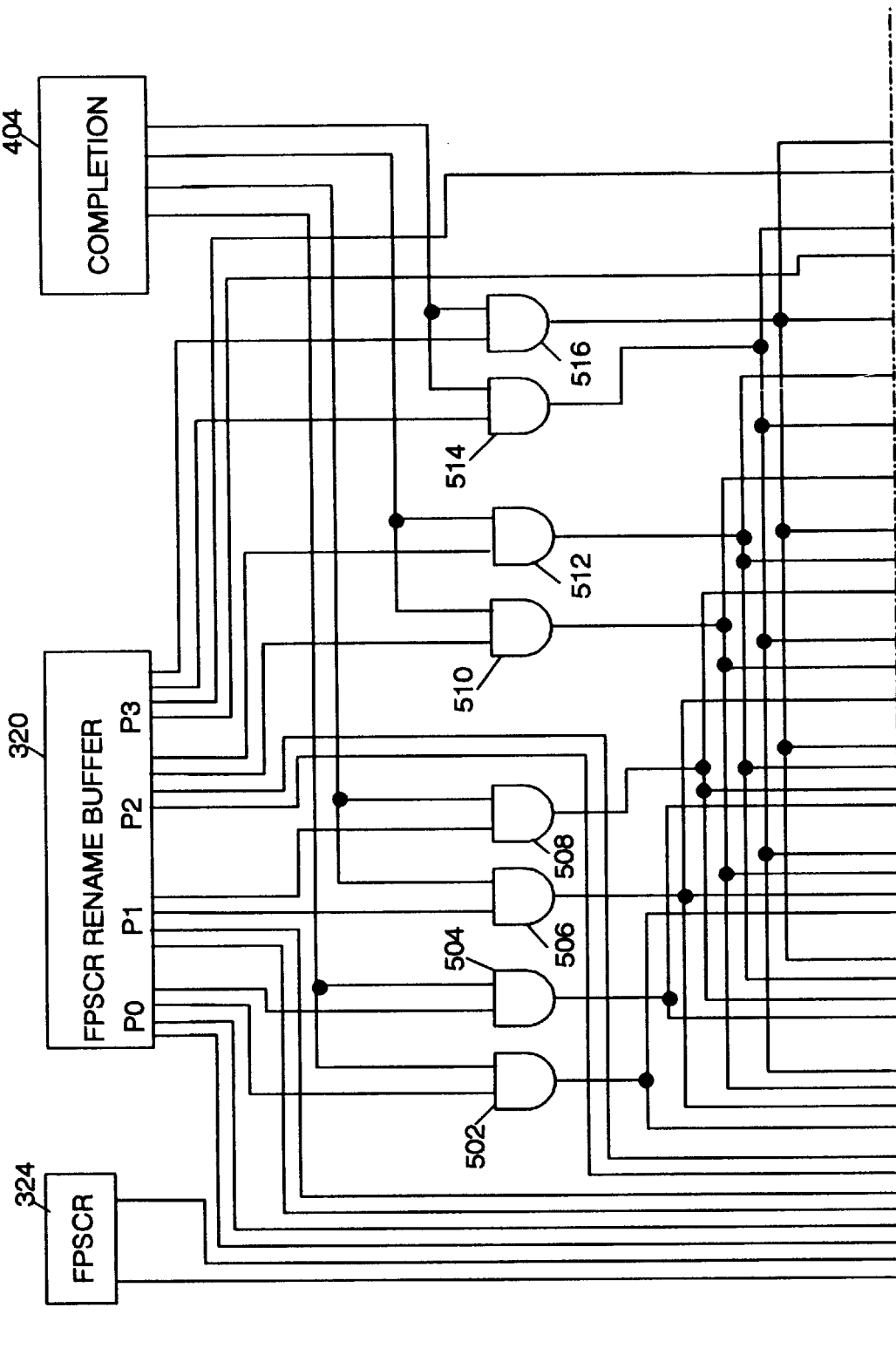
FIG. 5A & B illustrates, in partial block diagram form, an FPSCR re-order logic circuit in accordance with one embodiment of the present invention.
Figures 5, 5B:
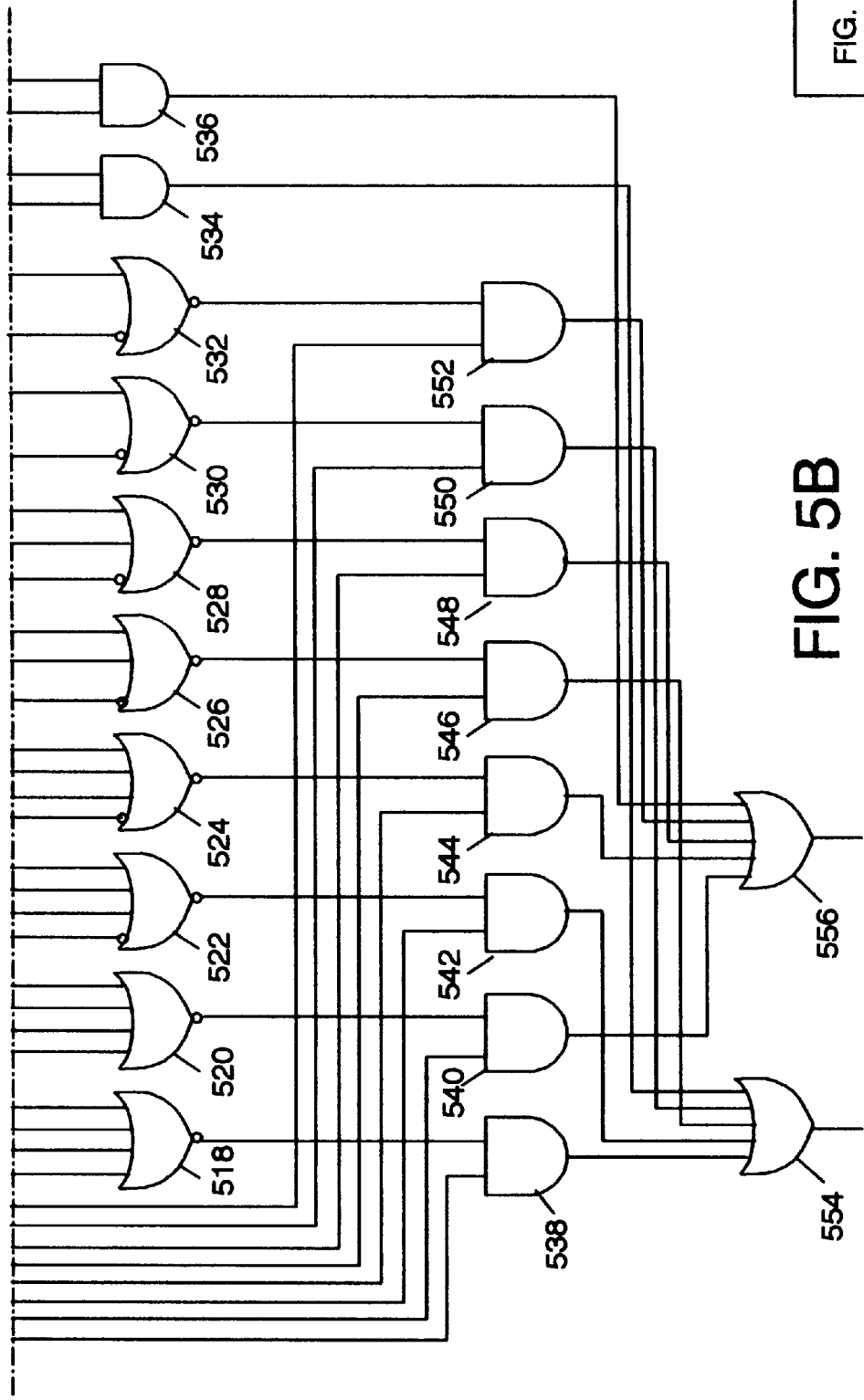

FIG. 5 illustrates an embodiment of FPSCR re-order logic 322 for non-sticky bits. In FIG. 5, FPSCR re-order logic circuit 322 comprises a plurality of AND gates 502–516, a plurality of NOR gates 518–532, a plurality of AND gates 534–552, an OR gate 554, and an OR gate 556. An output of FPSCR 324 is coupled to an input of each of AND gates 538 and 540. Associated with each of port 0 through port 3 of FPSCR rename buffer 320 are four signals, wherein two signals represent control values and two signals represent two classes of non-sticky status values. Each class of non-sticky status values comprises a plurality of non-sticky status bits. The two control values represent controls for each of the two non-sticky status classes. Each control signal indicates that a completing instruction altered a corresponding non-sticky class when the control signal is asserted. A port 0 (P0) non-sticky first class control signal provided from FPSCR rename buffer 320 is provided to an input of AND gate 502 with a second port 0 non-sticky second class control signal provided as an input of AND gate 504. Additionally, a port 0 first class plurality of non-sticky bits are provided as an input of AND gate 542 and a port 0 second class plurality of non-sticky bits are provided as input to AND gate 544. Port 1 (P1) non-sticky class control signals are provided by FPSCR rename buffer 320 to an input of AND gate 506 and an input of AND gate 508. Port 1 non-sticky status bits are provided as an input of AND gate 546 and an input of AND gate 548. Port 2 (P2) non-sticky class control signals are provided by FPSCR rename buffer 320 is provided to an input of AND gate 510 and an input of AND gate 512. Port 2 non-sticky bits are provided as an input of AND gate 550 and an input of AND gate 552. Port 3 (P3) non-sticky class control signals are provided by FPSCR rename buffer 320 is coupled to an input of AND gate 514 and an input of AND gate 516. Port 3 non-sticky status bits are provided as an input of AND gate 534 and an input of AND gate 536. Completion circuit 404 provides a first completion signal to AND gates 502 and 504. Completion circuit 404 provides a second completion signal to inputs of AND gate 506 and 508. Completion circuit 404 provides a third completion signal to inputs of AND gates 510 and 512. Completion circuit 404 provides a fourth completion signal to inputs of AND gates 514 and 516.

An output of AND gate 502 is coupled to an input of NOR gate 518 and an inverted input of NOR gate 522. An output of AND gate 504 is coupled to an input of NOR gate 520 and an inverted input of NOR gate 524. An output of AND gate 506 is coupled to an input of NOR gate 518, an input of NOR gate 522, and an inverted input of NOR gate 526. An output of AND gate 508 is coupled to an input of NOR gate 520, an input of NOR gate 524, and an inverted input of NOR gate 528. An output of AND gate 510 is coupled to an input of NOR gate 526, an input of NOR gate 522, an input of NOR gate 518, and an inverted input of NOR gate 530. An output of AND gate 512 is coupled to an input of NOR gate 528, an input of NOR gate 524, an input of NOR gate 520, and an inverted input of NOR gate 532. An output of AND gate 514 is coupled to an input of NOR gate 530, an input of NOR gate 526, an input of NOR gate 522, an input of NOR gate 518, and an input of AND gate 534. An output of AND gate 516 is coupled to an input of NOR gate 532, an input of NOR gate 528, an input of NOR gate 524, an input of NOR gate 520, and an input of AND gate 536.

An output of NOR gate 518 is coupled to an input of AND gate 538, an output of AND gate 538 is coupled to an input of OR gate 554. An output of NOR gate 520 is coupled to an input of AND gate 540. An output of AND gate 540 is coupled to an input of OR gate 556. An output of NOR gate 522 is coupled to an input of AND gate 542. An output of AND gate 542 is coupled to an input of OR gate 554. An output of NOR gate 524 is coupled to an input of AND gate 544. An output of AND gate 544 is coupled to an input of OR gate 556. An output of NOR gate 526 is coupled to an input of AND gate 546. An output of AND gate 546 is coupled to an input of OR gate 554. An output of NOR gate 528 is coupled to an input of AND gate 548. An output of AND gate 548 is coupled to an input of OR gate 556. An output of NOR gate 530 is coupled to an input of AND gate 550. An output of AND gate 550 is coupled to an input of OR gate 554. An output of NOR gate 532 is coupled to an input of AND gate 552. An output of AND gate 552 is coupled to OR gate 556. An output of AND gate 534 is coupled to an input of OR gate 554. An output of AND gate 536 is coupled to an input of OR gate 556.

The text provided above has described the connectivity of the present invention. Description of the present will subsequently be provided in greater detail.

Description of Operation

FIG. 1 illustrates a data processing system 100 which implements one embodiment of the present invention. It should be noted that the present invention is implemented in a portion of CPU 110 and is used to provide data and control information to a remaining portion of data processing system 100.

FIG. 2 illustrates the portion of CPU 110 in greater detail. During operation of one embodiment of the present invention, instructions are fetched from I-cache 202 and provided to instruction unit/branch unit 204 with the appropriate control signals for their execution. Operation of an instruction cache, such as I-cache 202, is well-known in the data processing art and, therefore, will not be described in greater detail herein. Within instruction unit/branch unit 204, the instructions provided by I-cache 202 are stored in registers. Specifically, there are four dispatch registers (not illustrated herein) in one embodiment of the present invention. Each of these four dispatched registers is accessed and four instructions are dispatched in a single cycle therefrom. Furthermore, each of the four dispatch registers include an instruction part, an instruction pre-decode part, and an instruction valid part. It should be noted that any number of dispatch registers may be implemented in the present invention with a corresponding modification in a remaining portion of the logic in the data processing system. Additionally, it should be recognized that the dispatch register may include different portions than those previously outlined herein.

As previously mentioned, the dispatch registers included in instruction unit/branch unit 204 include a pre-decode mechanism. This mechanism provides partially decoded information describing an instruction type and target information to facilitate the speedy determination of instruction characteristics. Furthermore, an instruction valid portion of the dispatch registers indicates that an instruction stored within a dispatch register is valid and may be accessed to perform a correct computing function. The use of valid portions and pre-decode mechanisms within an instruction dispatch register is well-known in the data processing art and, therefore, will not be described in greater detail herein. Information about each of the instructions is transferred to an appropriate one of FXU 206, load/store unit 208, and FPU 210 via the dispatched instructions. The functions generally performed by each of devices 206, 208, and 210 are also well-known in the data processing art and, therefore, will not be described in greater detail.

CPU 110 of the present invention dispatches four instructions and completes four instructions in each timing cycle. Furthermore, CPU 110 implements register renaming of all targets of floating point instructions executed therein. Additionally, FPU 210 of CPU 110 implements two independent floating point pipelines (FPU pipe 0 312 and FPU pipe 1 314 of FIG. 3), wherein only one pipe supports the execution of certain instructions. These instructions include a move-to-FPSCR instruction, a move-from-FPSCR instruction, and fpu rr instructions having a recording bit set. It should be noted that fpu rr instructions are computationally intensive floating point instructions. The use of the recording bit will subsequently be described in greater detail. Assume in one embodiment of the invention that only FPU pipe 0 312 supports the execution of the move-to-FPSCR instruction, the move-from-FPSCR instruction, and fpu rr instructions having the recording bit set. It should be noted that move-to-FPSCR instructions engage each of the bits of FPSCR 324 to be set or reset under instruction control. This is different than implementations which set an FPSCR to indicate the status of an operation. Move-from-FPSCR instructions allow FPSCR 324 to be read into an FPR for later storage into memory or for observation. Additionally, an fpu rr instruction allows a floating point rr-type instruction to set a condition register with an exception status of the operation or an indication of a result. For additional information on each of these types of instructions, refer to, "*The Power PC™ Architecture: A Specification for a New Family of Risk Processors*," edited by Cathy May, et al, published by Morgan Kaufmann Publishers, Inc., Chapter 4.6, Page 193 through 196, which is hereby incorporated by reference herein.

Furthermore, assume that FPU 210 has a pipeline which has the following form:

if|dr|e0|e1|e2|e3|wb|fi|cp|wv|pr|cb.

In the aforementioned pipeline, the terms described therein are defined as follows:
  if=instruction fetch (hidden)
  dr=instruction dispatch/register rename
  e0=operand fetch
  e1=execute 1 stage
  e2=execute 2 stage
  e3=execute 3 stage
  wb=right result to rename buffer (hidden)
  fi=finish (hidden)
  cp=complete (hidden)
  wv=right back vector to fpr (hidden)
  pr=prioritize fpr right (hidden)
  cb=copy from rename buffer to fpr (hidden).

Assume that an instruction executing within FPU 210 executes two instructions within the pipeline described above. If one of the operands of the second instruction provided to the pipeline is dependent upon an operand of the first instruction provided to the pipeline, a timing diagram for the first instruction (i0) and the second instruction (i1) follows:

instruction i0 if|dr|e0|e1|e2|e3|wb
  instruction i1 if|dr|e0|e0|e0|e0|e1|e2|e3|wb.

Furthermore, in some situations where a preselected operand is dependent upon a result of a first instruction being executed by the pipeline, the pipeline will have the following timing diagram for the first instruction i0 and the second instruction i1:

instruction i0 if|dr|e0|e1|e2|e3|wb
  instruction i1 if|dr|e0|e0|e0|e0|e0|e1|e2|e3|wb.

As the present invention resides in FPU 210 in one embodiment of the present invention, operation of FPU 210 will subsequently be described in greater detail.

Furthermore, within CPU 110, each of the functional units is buffered with instruction queues. The instruction queues for floating point instructions reside within the floating point unit (FPU) 210. It should be noted that each functional unit receives instructions from the dispatch register and stages the instructions in the instruction queue from which queue instructions are scheduled for issue to the pipelines. Issue unit/branch unit 204 signals I-cache 202 when the queue is full and can no longer accept instructions to be dispatched.

Within FPU 210, any two instructions may be issued from the bottom four queue positions to either of the two previously disclosed FPU pipes (FPU pipe 0 312 and FPU pipe 1 314 of FIG. 3). It should be noted, however, that certain instructions may only be issued to a designated FPU pipe. Such instructions include a move-from-FPSCR instruction, a move-to-condition register from FPSCR instruction, a move-to-FPSCR field immediate instruction, a move-to-FPSCR fields instruction, a move-to-FPSCR bit zero instruction, a move-to-FPSCR bit one instruction, and any FPU instruction having the recording bit set. These instructions were previously described in greater detail.

It should be noted that these instructions which may only be executed in a designated pipe are assumed to be instruction serialized or execution synchronized to facilitate their implementation in one embodiment to the present invention. Instruction serialization indicates that the instruction is not dispatched until all prior instructions in the instruction stream have completed. Alternatively, execution synchronization indicates that the instruction is not issued from the FPU's instruction queue until all prior instructions have finished. In one embodiment to the present invention, assume that these instructions are instruction serialized. As these types of instructions are executed in instruction order, these instructions will be denoted as in-order type instructions. With this assumption, an architected FPSCR is correct and available for reading by the in-order type instructions since all prior instructions are known to have completed. It should be noted that the FPSCR mechanism of the present invention is also easily adaptable to other processor pipe and completion configurations.

The present invention implements an FPSCR mechanism which supports out-of-order FPU instruction execution. The FPSCR mechanism of the present invention performs several functions. These functions include generating and reporting status information to a re-order buffer (not illustrated) within issue unit/branch unit 204 to allow interrupts to be posted as if the instructions were executed in an instruction order. Furthermore, to maintain correct operation, the FPSCR mechanism of the present invention maintains a history of instruction execution exceptions for each instruction which is finished (i.e. executed) out-or-order in a manner allowing the architected FPSCR to be reproduced and completed as if the instruction had executed in instruction sequence. It should be noted that the instruction is considered to have "completed" when architected facilities have been updated. Additionally, the FPSCR mechanism of the present invention reorders the exception history from instructions that have previously completed and for instructions completing in a current cycle. By reordering the exception history, the FPSCR mechanism of the present invention is able to determine an FPSCR status for sticky exception bits of the floating point status and control register. Additionally, the FPSCR mechanism of the present invention calculates the non-sticky status for the FPSCR from the maintained instruction execution history. The status is derived from a last instruction completing in a given cycle that alters the status information. Additionally, the FPSCR mechanism of the present invention generates exception summary status information for updating an architected FPSCR and provides architecturally precise FPSCR values upon an interrupt operation. Lastly, the FPSCR mechanism of the present invention reestablishes an FPSCR value to the pipelines of the floating point unit following an interrupt to reflect the last instruction completing before the occurrence of the interrupt.

Refer now to FIG. 3. FIG. 3 illustrates a portion of a floating point unit 210 which implements the FPSCR mechanism of the present invention. In FIG. 3, instructions issued from instruction cache 202 are provided to issue unit/branch unit 204. Issue unit/branch unit 204 subsequently provides a plurality of dispatched instructions, including the instructions labeled DISP I0, DISP I1, DISP I2, and DISP I3. Each of instruction decode circuits 302 through 308 decodes an associated one of instructions DISP I0, DISP I1, DISP I2, and DISP I3. Control, and register file address information derived from a decoded instruction are subsequently provided to the plurality of FPU instruction queues 326. Each of instruction decode circuits 302 through 308 determines a classification of each instruction provided to the floating point unit according to a preselected classification, with respect to updating FPSCR 324.

For an example of classification of a plurality of floating point unit instructions, refer to Table 1 below.

TABLE 1

| Instruction | FR | FI | C | FPCC | class |
|---|---|---|---|---|---|
| fmr | no | no | no | no | 1 |
| fneg | no | no | no | no | 1 |
| fabs | no | no | no | no | 1 |
| fnabs | no | no | no | no | 1 |
| fadd | yes | yes | yes | yes | 2 |
| fadds | yes | yes | yes | yes | 2 |
| fsub | yes | yes | yes | yes | 2 |
| fsubs | yes | yes | yes | yes | 2 |
| fmul | yes | yes | yes | yes | 2 |
| fnuls | yes | yes | yes | yes | 2 |
| fdiv | yes | yes | yes | yes | 2 |
| fdivs | yes | yes | yes | yes | 2 |
| fmadd | yes | yes | yes | yes | 2 |
| fmadds | yes | yes | yes | yes | 2 |
| fmaub | yes | yes | yes | yes | 2 |
| fmsubs | yes | yes | yes | yes | 2 |
| fnmadd | yes | yes | yes | yes | 2 |
| fnmadds | yes | yes | yes | yes | 2 |
| fnmsub | yes | yes | yes | yes | 2 |
| fnmsubs | yes | yes | yes | yes | 2 |
| frsp | yes | yes | yes | yes | 2 |
| fctid | yes | yes | yes* | yes* | 2 |
| fctidx | yes | yes | yes* | yes* | 2 |
| fctiw | yes | yes | yes* | yes* | 2 |
| fctiwz | yes | yes | yes* | yes* | 2 |
| fcfid | yes | yes | yes | yes | 2 |
| fcmpu | no | no | no | yes | 3 |
| fcmpo | no | no | no | yes | 3 |
| mffs | | | | special | |
| mcrfs | | | | special | |
| mtfsfi | | | | special | |
| mtfsf | | | | special | |
| mtfsb0 | | | | special | |
| mtfsb1 | | | | special | |

TABLE 1-continued

| Instruction | FR | FI | C | FPCC | class |
|---|---|---|---|---|---|
| fsqrt | yes | yes | yes | yes | 2 |
| fres | yes* | yes* | yes | yes | 2 |
| frsqrte | yes* | yes* | yes | yes | 2 |
| fsel | no | no | no | no | 1 |

In Table 1, a classification used by the methodology for updating the non-sticky status bits of FPSCR 324 is described for each type of instruction executed by FPU 210. Each of these instructions is a common floating point instruction. It should be remembered that non-sticky status bits of the FPSCR are those status bits which may be modified without maintaining history information from previous executed instructions. From Table 1, the non-sticky FPSCR bits are designated as "FR," "FI," "C," and "FPCC." The "FR" bit indicates whether a last arithmatic or rounding and conversion instruction that rounded the intermediate result incremented a fraction. The "FI" value indicates that the last arithmatic or rounding and conversion instruction either rounded the intermediate result to produce an inexact fraction or caused a disabled Overflow Exception. The "C" value is set in response to arithmatic, rounding, and conversion instructions to reflect a certain class of results. Lastly, the "FPCC" value is a floating-point condition code value. Floating-point compare instructions set one of the FPCC bits to a logic one value and the other three FPCC bits to zero, selectively. In one embodiment to the present invention, the high-order three bits of the FPCC retain their relational significance indicating that the value is less than, greater than, or equal to zero. For additional information on the non-sticky FPSCR bits, refer to *The Power PC™ Architecture: A Specification for a New Family of Risc Processors*, published by International Business Machines, Inc. and edited by Cathy May, et al., and published by Morgan Kaufmann Publishers, Inc., Pages 137 through 140, which is hereby incorporated by reference herein. Furthermore, as is illustrated in Table 1, each of the instructions has an associated class. It is this class which is determined by each of the plurality of instruction decode circuits 302 through 308. It should be noted that the classification of instructions is based upon the need to update the non-sticky FPSCR bit illustrated therein for a given floating point unit operation involving the associated instruction.

Thus, each of the plurality of instruction decode logic circuits 302 through 308 determines the classification of a floating point unit instruction dispatched to floating point unit 210. In determining the classification, each of the plurality of instruction decode logic circuits 302 through 308 generates a plurality of update signals to indicate which non-sticky bits within FPSCR 324 should be updated during execution of the instruction. A state of these update signals is saved as status information within the plurality of FPU instruction queues 326. Subsequently, when the instruction is removed from one of the plurality of FPU instruction queues 326 and issued to one of FPU pipe 0 312 and FPU pipe 1 314, these update signals are sent to an appropriate FPU pipe. Once provided to one of FPU pipe 0 312, FPU pipe 1 314, the update signals are piped with the instruction down the execution pipeline and saved in FPSCR rename buffer 320, together with status information generated during execution of the instruction within one of the floating point pipes. It should be noted that status information is generated for an instruction executing within FPU pipe 0 312 via pipe 0 status circuit 316. Similarly, status information generated by an instruction executing within FPU pipe 1 314 is generated by pipe 1 status circuit 318. The update information, together with the status information is used when an instruction is completing to determine whether the completing instruction updated the FR, FI, C, and FPCC non-sticky bits within FPSCR 324. By determining whether or not the completing instruction updated these non-sticky bits, the architected FPSCR 324 value may be accurately calculated. This determination will subsequently be described in greater detail.

In addition to providing the instruction and update bits from an appropriate one of the plurality of FPU instruction queues 326 to an appropriate execution pipe within FPU 210 at a time of issue, issue logic within the out-of-order FPSCR mechanism of the present invention must also save an indication of whether an FPSCR-type instruction, such as those previously discussed, was issued to FPU pipe 0 312.

Once the indication of an FPSCR-type instruction is set to a predetermined logic state, the state of the indicator is preserved until the FPSCR-type instruction, an in-ordered instruction by definition, is completed from FPSCR rename buffer 320. The completion of the in-order type instruction is reflected in a completion signal transferred from FPSCR re-order logic circuit 322 to move to FPSCR circuit 310. It should be noted that detection of an in-order type instruction issued to FPU pipe 0 312 may be performed by decoding the instruction being provided to FPU pipe 0 312 to determine whether it is one of a preselected set of instructions or if the recording bit is set for the appropriate instruction. The recording bit is bit 31 of certain instructions in some embodiments to the present invention. For additional information, refer to *The Power PC™ Architecture: A Specification for a New Family of Risc Processors*, published by International Business Machines, Inc. and edited by Cathy May, et al., at 194–95, which are hereby incorporated by reference herein. It should be noted that the preselected set of instructions may include the previous instructions referred to as the move-from-FPSCR instruction, the move-to-condition register from FPSCR, the move-to-FPSCR field immediate instruction, the move-to-FPSCR field instruction, the move-to-FPSCR bit 0 instruction, and the move-to-FPSCR bit 1 instruction. Such a detection operation may be performed by issue logic associated with the plurality of FPU instruction queues 326. Implementing such detection logic is well-known in the data processing art and, therefore, will not be described in greater detail herein. Additionally, it should be noted that resetting the state from which an in-order instruction was issued to FPU pipe 0 312 is relatively easy to perform due to the serialization of the move-to-FPSCR instruction. Thus, the state indication that an in-order instruction was issued to FPU pipe 0 312 is simply reset every cycle in which an FPU instruction is completing. In one embodiment to the present invention, a first FPU instruction complete signal provided by the reorder buffer is used to reset a bit indicating that an FPSCR-type instruction is executing.

During execution of instructions within FPU pipe 0 312, pipeline data is provided to pipe 0 status circuit 316. Similarly, during execution of an instruction within FPU pipe 1 314, pipeline data is provided to pipe 1 status circuit 318. Pipe 0 status circuit 316 and pipe 1 status circuit 318 receive this pipeline data to calculate the status of an instruction. It should be noted that the status is generated within pipe 0 status circuit 316 and pipe 1 status circuit 318 as if no prior exception has occurred for all instructions other than those specified in in-order type instructions. In-order instructions calculate the FPSCR exactly in Pipe 0's status circuit 316. Furthermore, FPSCR 324 is coupled to each of FPU pipe 0 312 and FPU pipe 1 314 to provide architected FPSCR control information to each of pipe 0 312 and FPU pipe 1 314 to control their execution. This architected FPR control information is also used to support the execution of in-order type instructions, such as those listed above by providing the FPSCR value to pipe 0 status circuit's (316) determination so that accurate status information can be produced for these instructions and saved in the rename buffer. It should be noted that the architected FPSCR status information is ignored when status information is calculated for execution of other FPU instructions. The architected FPSCR status value in FPU pipe 0 312 is ignored by gating the architected FPSCR status values to zero for their execution. Additionally, pipe 0 status circuit 316 and pipe 1 status circuit 318 generate exception reports that are supplied to the re-order buffer (not illustrated herein) as if all prior sticky status bits of the FPSCR value were zero. Since the re-order buffer processes such exceptions in instruction order, the interrupts for the earliest interrupting instruction will be taken. Subsequent instructions will be cancelled. As such, precise interrupts can be posted.

It should be noted that precise interrupts are typically used during a debug process to aide software designers and developers in debugging their software code. When an instruction is executed in an out-of order data processing system, it is possible for a break point to occur during execution of an instruction. In prior art systems, this could result in incorrect data being accessed from the FPSCR. However, with the present invention, the values stored within the re-order buffer indicate status associated with instruction interrupt. This status is then utilized to determine a correct FPSCR value in accordance with the teachings of the present invention.

The status information calculated by pipe 0 status circuit 316 and pipe 1 status circuit 318 is maintained in FPSCR rename buffer 320. For instructions that qualify for out-of-order execution, the saved status value is the status for only that instruction. It should be noted that "independent" instructions are those non-in-order instructions wherein the instruction is truly independent or its dependencies have been calculated and are available from either a floating point register or a floating point rename buffer. Only primary status information is saved in FPSCR rename buffer 320 in one embodiment of the present invention. Summary bits are not saved, but are regenerated from the primary bits upon instruction completion. It should be noted that summary bits reflect logical combinations of primary status bits. Examples of such summary bits are discussed in greater detail in *The Power PC™ Architecture. The Specification for a New Family of Risc Processors*, published by International Business Machines, Inc. and edited by Cathy May, et al. at Page 137, which is hereby incorporated by reference herein.

Furthermore, in addition to these primary status bits, the piped update bits previously discussed, are also retained in FPSCR rename buffer 320 to control the updating of the non-sticky bits during an FPSCR re-ordering operation. During an FPSCR re-ordering operation, FPSCR re-order logic 322 receives a completion control from the re-order buffer to indicate which floating point unit instructions are to be completed. FPSCR re-order logic circuit 322 then re-orders the status bits saved in FPSCR rename buffer 320 to generate the architecturally compliant FPSCR.

Re-ordering of FPSCR 324 is performed through the use of logic circuits such as those illustrated in FIGS. 4 and 5. It should be noted that FIG. 4 provides a logic circuit for calculating a status of the primary sticky status bit and FIG.

5 illustrates a logic circuit for calculating the non-sticky status bits. In both FIGS. 4 and 5, completion of up to four instructions is specified by the signals from completion block 404. Completion block 404 is typically located within issue unit/branch unit 204. The signals provided by completion block 404 are derived from the re-order buffer.

If a completion signal is asserted by completion block 404, then a next sequential entry into FPSCR rename buffer 320 is used to calculate the value stored within FPSCR 324. FPSCR rename buffer 320 stores primary status and update control values. FPSCR re-order logic 322 performs calculations to determine the value to be stored within FPSCR 324.

In one embodiment of the present invention, the completion signals provided by completion block 404 are assumed to be thermometer encoded.

Refer now to FIG. 4 which provides the logic circuit for implementing a re-order operation of sticky bits within FPSCR 324. In FIG. 4, sticky status bits are read from the architected FPSCR 324 and gated with the complete move to FPSCR signal provided by move to FPSCR circuit 310. The complete move to FPSCR signal indicates that a port value is accurate because it was calculated for one of the in-ordered type instructions. Because in-order type instructions can reset a sticky status bit and the value retained in FPSCR rename buffer 320 is accurately computed via status circuit 316, the value of the sticky status bit from FPSCR 324 should not be logically "OR'ed" with the value read from FPSCR rename buffer 320. Otherwise, the reset sticky bit might be erroneously set. Therefore, the sticky bit from FPSCR 324 is gated "off" if the complete move to FPSCR signal from FPSCR circuit 310 is asserted. It should be noted that in-order type instructions can only be associated with port p0 of FPSCR rename buffer 320 due to serialization of their execution. All completing instructions on ports P1 through P3 are guaranteed to not be in-order type instructions because of instruction serialization of such instructions. Therefore, instructions completing on these ports do not require the resetting of any sticky status bit. These instructions can then be logically OR'ed with the gated FPSCR 324 sticky status bit, as described above, and with the other sticky status bits read from ports 0 through 3 of FPSCR rename buffer 320 that are gated with the associated completion signals from FPSCR re-order logic circuit 322 to calculate the primary sticky status values. The gating and logical combinations illustrated within FIG. 4 are sufficient to produce the primary sticky status value. This primary sticky status value is subsequently stored within architected FPSCR 324.

As previously mentioned, summary status bits may be derived from these primary status bits in a straight forward manner.

The foregoing has provided a description of re-ordering of the sticky bits of FPSCR 324. The re-ordering of the non-sticky bits of FPSCR 324 is illustrated in greater detail in FIG. 5. As is illustrated in Table 1, non-sticky bits can be divided into separate classes and instructions for updating the non-sticky bits. In one embodiment of the present invention, the non-sticky bits can be divided into three classes of instructions. Through these classifications, the non-sticky bits may be updated under control of two update bits. Thus, from each port of FPSCR rename buffer 320 the FR, FI, C, and FPCC status bits, an update_FRFIC (the FR, FI, and C non-sticky status bits), and an update_FPCC (the FPCC status bit) are provided. It should be noted that these signals are not separately labeled within FIG. 5 as to do so would unduly confuse the illustration of the logic circuitry described therein.

Since the bits to be re-ordered are non-sticky, the last instruction which completes that alters the status should be selected for updating FPSCR 324. If no instruction is completing that alters the non-sticky bits, then the status within FPSCR 324 is retained. Such result is obtained by gating the update bits, update_FRFIC and update_FPCC, with the completion indicators from the re-order buffer using AND gates 502 through 516. The results of this gating operation is decoded for all ports to determine a latest completing instruction updating the status of the value stored within FPSCR 324 using NOR gates 518 through 532. The results of this decode operation are then used to select which of the values provided by the four ports, or the value provided by the architected FPSCR, should update the value stored within FPSCR 324 using AND gates 538 through 552 and OR gates 554 and 556.

The foregoing description has provided one embodiment of the present invention. It should be noted that the logic for the disclosed mechanism has been described using an assumed CPU/FPU design. The explicit design described herein is representative of alternatives that may be included in the mechanism being disclosed and their dependence on the CPU/FPU design within which the mechanism is to be used. It should be noted that the description within the stated environment is by no means intended to limit the mechanism to the described characteristics. Adjustment of the mechanism to other CPU/FPU design constraints should be obvious to those skilled in the art. In addition, the partitioning of logic between cycles has been avoided in the present invention since this implementation is highly dependent upon the desired machine cycle time. Different partitioning of the logic may be created and still fall under the scope of this disclosure. Such partitioning of logic between cycles is a well-known tuning method to those experienced in the art of logic design.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   input means for communicating a plurality of instructions;
   a register for storing a status control value;
   a first status logic circuit for selectively generating a first plurality of status values in response to the first one of the plurality of instructions;
   a re-order logic circuit coupled to the first status logic circuit to receive the first plurality of status values and coupled to the register to receive the status control value, the re-order logic circuit generating a current status control value in response to the first plurality of status values and the status control value;
   a rename buffer for selectively storing the first plurality of status values for an out-of-order executing instruction; and
   a latch for selectively storing an in-order status value for in-order executing instructions.

2. The data processing system of claim 1, wherein the status control value corresponds to a past plurality of status values generated in response to a previous one of the plurality of instructions.

3. The data processing system of claim 1, comprising:
   a completion circuit for providing a plurality of completion signals, wherein each of the plurality of completion signals corresponds to one of the portion of the plurality of instructions completing execution in a first execution pipe.

4. The data processing system of claim 3, wherein the re-order logic circuit logically combines at least one of the plurality of completion signals, the first plurality of status values and the status control value to generate the current status control value.

5. The data processing system of claim 4, wherein the current status control value comprises a plurality of sticky bits.

6. The data processing system of claim 4, wherein the current status control value comprises a plurality of non-sticky bits.

7. The data processing system of claim 1, wherein the portion of the plurality of instructions are executed in a first execution pipe using out-of-order execution.

8. The data processing system of claim 7, comprising:
a completion circuit for providing a plurality of completion signals provided in-order, wherein each of the plurality of completion signals corresponds to one of the portion of the plurality of instructions completing execution in the first execution pipe.

9. The data processing system of claim 1, comprising:
interrupt means for initiating an interrupt operation in response to a first exception signal generated by the first status logic circuit in response to the first plurality of status values.

10. The data processing system of claim 9, wherein the interrupt means initiates a plurality of interrupt operations in response to a plurality of exception signals generated by the first status logic circuit while a portion of the plurality of instructions is executing.

11. The data processing system of claim 10, wherein the portion of the plurality of instructions is executed out-of-order by the first execution pipe and wherein the plurality of exception signals are generated out-of-order.

12. The data processing system of claim 11, wherein the re-order logic circuit generates the status control value to correspond to a last plurality of status values generated in response to a previous one of the plurality of instructions executed prior to initiation of a first one of the plurality of interrupt operations.

13. The data processing system of claim 1, comprising:
an instruction decode circuit for decoding the plurality of instructions to provide a plurality of information signals.

14. The data processing system of claim 13, wherein the plurality of information signals indicate when a corresponding one of the plurality of instructions modifies one of a first non-sticky value and a second non-sticky value in the status control value stored in the register.

15. The data processing system of claim 14 wherein said rename buffer is operable for storing the plurality of information signals.

16. The data processing system of claim 13, wherein the plurality of information signals selectively indicates that one of an instruction serialized instruction and an execution synchronized instruction is received by the input means.

17. The data processing system of claim 1, wherein the in-order executing instructions are one of instruction serialized instructions and execution synchronized instructions.

18. The data processing system of claim 1, wherein the re-order logic circuit logically combines the plurality of status values and the status control value to generate the current status control value during an interval when the out-of-order instruction is completing.

19. The data processing system of claim 1, wherein the in-order status value corresponds to the current status control value during an interval when the in-order instruction is completing.

20. A method for operating a data processing system, comprising the steps of:
communicating a plurality of instructions;
storing a status control value in a register;
selectively generating a first plurality of status values in response to the first one of the plurality of instructions;
generating a current status control value in response to the first plurality of status values and the status control value;
selectively storing the first plurality of status values for an out-of-order executing instruction in a rename buffer; and
selectively storing an in-order status value for in-order executing instructions in a latch.

21. The method of claim 20, comprising the step of:
logically combining the plurality of status values and the status control value to generate the current status control value during an interval when the out-of-order instruction is completing.

22. The method of claim 20, wherein the in-order status value corresponds to the current status control value during an interval when the in-order instruction is completing.

* * * * *